US010831930B2

(12) United States Patent
Veeraragavan et al.

(10) Patent No.: US 10,831,930 B2
(45) Date of Patent: Nov. 10, 2020

(54) MANAGEMENT OF END USER PRIVACY CONTROLS

(71) Applicant: Schibsted Products & Technology UK Limited, London (GB)

(72) Inventors: Narasimha Raghavan Veeraragavan, London (GB); Sverre Sundsdal, London (GB); Karen Victoria Lees, London (GB)

(73) Assignee: Schibsted Products & Technology AS, Oslo (NO)

( * ) Notice: Subject to any disclaimer, the term of this patent is extended or adjusted under 35 U.S.C. 154(b) by 263 days.

(21) Appl. No.: 15/963,200

(22) Filed: Apr. 26, 2018

(65) Prior Publication Data
US 2018/0314855 A1 Nov. 1, 2018

(30) Foreign Application Priority Data

Apr. 26, 2017 (EP) ..................................... 17168134

(51) Int. Cl.
*G06F 21/62* (2013.01)
*H04L 29/08* (2006.01)
*H04L 29/06* (2006.01)
*G06Q 30/02* (2012.01)
(52) U.S. Cl.
CPC ...... *G06F 21/6263* (2013.01); *G06F 21/6245* (2013.01); *G06F 21/6254* (2013.01); *G06Q 30/0251* (2013.01); *H04L 63/101* (2013.01); *H04L 63/20* (2013.01); *H04L 67/306* (2013.01)

(58) Field of Classification Search
CPC ......................... G06F 21/6254; G06F 21/6245
See application file for complete search history.

(56) References Cited

U.S. PATENT DOCUMENTS

| 9,210,217 | B2* | 12/2015 | Raleigh | H04L 67/306 |
| 2003/0105864 | A1* | 6/2003 | Mulligan | H04L 67/04 709/225 |
| 2007/0174472 | A1* | 7/2007 | Kulakowski | H04L 63/1466 709/229 |
| 2007/0260514 | A1* | 11/2007 | Burdick | G06Q 30/02 705/14.46 |
| 2008/0015927 | A1* | 1/2008 | Ramirez | G06Q 30/02 705/7.29 |
| 2008/0103898 | A1* | 5/2008 | Flake | G06Q 30/0277 705/14.41 |

(Continued)

OTHER PUBLICATIONS

Extended European Search Report for EP Application No. EP17168134.9, dated Aug. 8, 2017; 7 pages.

(Continued)

*Primary Examiner* — Ali Shayanfar
(74) *Attorney, Agent, or Firm* — Harness, Dickey & Pierce, P.L.C.

(57) ABSTRACT

The present disclosure relates to the management of end user privacy controls using a privacy broker system, method, computer program and electronic device for managing end user privacy controls of a plurality of end users across a plurality of end user services. The system is configured to receive from a publisher entity a privacy event relating to an end user of the plurality of end users, determine one or more target subscriber entities and communicate the privacy event to the one or more target subscriber entities.

20 Claims, 4 Drawing Sheets

(56) References Cited

U.S. PATENT DOCUMENTS

| | | | | |
|---|---|---|---|---|
| 2008/0103900 | A1* | 5/2008 | Flake | G06Q 30/0251 705/14.41 |
| 2008/0103952 | A1* | 5/2008 | Flake | G06Q 20/102 705/37 |
| 2011/0173071 | A1 | 7/2011 | Meyer et al. | |
| 2013/0080330 | A1* | 3/2013 | Francis | G06Q 30/0275 705/50 |
| 2013/0080767 | A1* | 3/2013 | Francis | H04M 3/4878 713/154 |
| 2013/0139215 | A1* | 5/2013 | Hu | H04L 63/20 726/1 |
| 2013/0291123 | A1 | 10/2013 | Rajkumar et al. | |
| 2014/0059693 | A1* | 2/2014 | Stecher | G06F 21/45 726/26 |
| 2014/0282852 | A1* | 9/2014 | Vestevich | G06F 21/6263 726/1 |
| 2015/0242601 | A1* | 8/2015 | Griffiths | G06F 21/31 726/5 |
| 2016/0232570 | A1* | 8/2016 | Wilson | G06Q 30/0257 |
| 2019/0332800 | A1* | 10/2019 | Veeraragavan | G06F 16/125 |

OTHER PUBLICATIONS

Miguel Castro et al., "SCRIBE: A large-scale and decentralized application-level multicast infrastructure" in IEEE Journal on Selected Areas in Communications, vol. 20, No. 8, Oct. 2002, 11 pages.

Gregory Chockler et al., "SpiderCast: A Scalable Interest-Aware Overlay for Topic-Based Pub/Sub Communication," 12 pages.

P.Th. Eugster et al. "The Many Faces of Publish/Subscribe" 24 pages.

Simon Godik et al., "OASIS eXtensible Access Control Markup Language (XACML)," Jul. 12, 2002, 61 pages.

Jay Kreps et al., "Kafka: a Distributed Messaging System for Log Processing," 7 pages.

Shayak Sen et al., "Bootstrapping Privacy Compliance in Big Data Systems," 16 pages.

Vinay Selly et al., "PolderCast: Fast, Robust, and Scable Architecture for P2P Topic-Based Pub/Sub," in 13th International Middleware Conference, Dec. 2012, Montreal, QC, Canada, 21 pages.

Vinay Selly et al., "The hidden pub/sub of spotify," https://www.researchgate.net/publication/262165825, Jun. 2013, 11 pages.

Slim Trabelsi et al., "PPL: PrimeLife Privacy Policy Engine," 2011 IEEE International Symposium on Policies for Distributed Systems and Networks, 2 pages.

Jinesh Varia et al., "Overview of Amazon Web Services," in Amazon Web Services, Jan. 2014, 22 pages.

Shelley Q. Zhuang, et al., "Bayeax: An Architecture for Scalable and Fault-tolerant Wide-area Data Dissemination," Computer Science Division, University of California at Berkeley, 9 pages.

https://grpc.io/.
https://developers.google.com/protocol-buffers/.
http://xml.coverpages.org/xacml.html.
https://www.w3.org/Submission/2003/SUBM-EPAL-20031110/.

* cited by examiner

MANAGEMENT OF END USER PRIVACY CONTROLS

This application claims priority to European Application No. 17168134.9, which was filed Apr. 26, 2017. This priority application is hereby incorporated by reference in its entirety into the present application to the extent consistent with the present application.

TECHNICAL FIELD

The present disclosure relates to managing end user privacy controls of a plurality of end users across a plurality of end user services.

BACKGROUND

When a company or entity provides services to end users, such as personalised content and/or targeted advertisements, it is usually necessary to collect a wide variety of datasets such as profile, behaviour, location, payment and communication messages about each end user. With the new EU General Data Protection Regulations (GDPR) scheduled to take effect from 25 May 2018, each user using the provided services has a right to decide how his/her datasets should be governed or used by the services. It is therefore necessary to provide some privacy controls to end users.

However, an ecosystem of services provided by the company or entity may comprise a plurality, potentially hundreds, of independent services that have evolved organically over time, rather than forming a centralized top-down design. Properly managing privacy controls across all services of the eco-system, for all users of the services, is a complex task. Furthermore, the services may be offered in a plurality of countries around the world, for example 30 countries, a number of which may have different requirements and/or legislation relating to user privacy. Furthermore, there may be a large number of users of the services offered by the company or entity, for example 200 million users/month, generating a large number of webpage views per month, for example 20 billion views/month, resulting in a large number of user service events, for example 700 million user events per day.

Consequently, it can be seen that there is a need for a large scale, highly scalable, system that can reliably manage privacy controls for a large, and potentially growing, end user base across a large, and potentially growing, ecosystem of services.

SUMMARY

In a first aspect of the present disclosure, there is provided a privacy broker system for managing end user privacy controls of a plurality of end users across a plurality of end user services. The privacy broker system is configured to: receive from a publisher entity a privacy event relating to an end user of the plurality of end users, the privacy event comprising a user ID uniquely indicative of the end user and a privacy request relating to an end user privacy control determine, based at least in part on the privacy request, one or more target subscriber entities; and communicate the privacy event to the one or more target subscriber entities, wherein the publisher entity comprises a front-end tool of an end user service, and wherein each of the one or more target subscriber entities comprises a backend service for enacting the privacy request (for example, a backend service which relates to a user service within an ecosystem of services).

This system may enable large scale privacy in a highly scalable way. New front-end and backend services can straightforwardly by added by registering additional publisher entities and subscriber entities. Furthermore, privacy controls may be reliably implemented across an entire ecosystem of services since a user's privacy event send from the front-end of one particular service can be forward to, and enacted by, backend services relating to a whole host of services who should be enacting that privacy event.

The privacy broker system may comprise a broker engine, or one or more broker works, or any other suitable module, to determine the one or more target subscriber entities and communicate the privacy event to the one or more target subscriber entities.

Preferably, the privacy broker system further comprises a broker database configured to store the privacy event and an associated progress status identifier that is indicative of progress towards the one or more target subscriber entities enacting the privacy request.

The privacy broker system may thereby monitor the progress of enacting the privacy requests and take any necessary action to improve the prospects of the privacy requests being properly enacted and/or to notify end users when their privacy requests have been enacted.

For example, the privacy broker system may be configured to receive from a first target subscriber entity of the one or more target subscriber entities a completion notification indicative of the one or more target subscriber entities having successfully enacted the privacy request; and set the progress status identifier associated with the privacy event in the broker database to indicate that the privacy request has been enacted by the first target subscriber entity.

Furthermore, the privacy broker system may further comprise a user notification module configured to, when the progress status identifier associated with the privacy event in the broker database is set to indicate that the privacy request has been enacted by all of the one or more target subscriber entities, communicate a confirmation of enactment to the end user. Thus, the end user may be made aware that all of the relevant subscriber entities have enacted their privacy request and can thereby be satisfied that their privacy request has been properly honoured.

Additionally, or alternatively, the privacy broker system may further comprise a privacy compliance monitor configured to identify, using the progress status identifier in the broker database, a target subscriber entity of the one or more target subscriber entities for the privacy event that fails to meet an enactment requirement and, upon identifying a target subscriber entity of the one or more target subscriber entities that fails to meet an enactment requirement, re-communicate the privacy event to that target subscriber entity. The enactment requirement comprises a requirement that the one or more target subscriber entities enact the privacy request within a threshold period of time (for example, within a 'time to honour') since the privacy event was most recently communicated to the one or more target subscriber entities.

In this way, the privacy broker system may improve the prospects of the privacy requests being properly enacted by reducing the chance of a privacy request not being enacted as a result of an error or failure in the communication of the privacy event to the one or more target subscriber entities and/or by reminding the one or more target subscriber entities of the privacy event to be enacted.

The privacy compliance monitor may be further configured to, if the number of times the privacy event is re-communicated to a particular target subscriber entity of the one of the one or more target subscriber entities exceeds a re-communication threshold, perform a predetermined privacy event failure action.

The predetermined privacy event failure action may comprise at least one of: communicate a failure alert to an entity responsible for the particular target subscriber entity; and/or set the progress status identifier associated with the privacy event in the broker database to indicate that the particular target subscriber entity has failed to enact the privacy request.

In this way, a fault or persistent failure in the particular target subscriber entity may be identified and appropriate action may be taken in order to rectify the issue. Thus, the reliability of enacting end user privacy requests may be improved.

The privacy broker system may be further configured to, after communicating the privacy event to the one or more target subscriber entities, update the progress status identifier associated with the privacy event in the broker database to indicate that the privacy event has been communicated to the one or more target subscriber entities.

Additionally, or alternatively, the privacy broker system may be further configured to receive from the one or more target subscriber entities an acknowledgment notification indicative of the one or more target subscriber entities receiving the privacy event but not yet enacting the privacy request and update the progress status identifier associated with the privacy event in the broker database to indicate that the privacy event has been received by the one or more target subscriber entities but has not yet been enacted.

Thus, progress through the process of enacting an end user privacy request may be usefully tracked.

Preferably, the privacy broker system further comprises an end user profile database for storing data relating to the end user, wherein the privacy request comprises a request for a desired privacy state of a stateful end user privacy control, and wherein the privacy broker system is further configured to store the desired privacy state of the stateful end user privacy control in the end user profile database.

The privacy broker system may be further configured to instruct the one or more target subscribers to obtain the desired privacy state of the stateful end user privacy control from the end user profile database.

In this way, the most recently desired privacy state for a stateful end user privacy control may be reliably recorded by the privacy broker system and enacted by the one or more target subscriber entities, thereby improving the reliability of enacting the correct, most recent, privacy state, particularly in the event that the end user makes a number of changes to the desired privacy state in a short period of time.

In a second aspect of the present disclosure, there is provided a method for managing end user privacy controls of a plurality of end users across a plurality of end user services, the method comprising a privacy broker system: receiving from a publisher entity a privacy event relating to an end user of the plurality of end users, the privacy event comprising: a user ID uniquely indicative of the end user; and a privacy request relating to an end user privacy control; determining, based at least in part on the privacy request, one or more target subscriber entities; and communicating the privacy event to the one or more target subscriber entities, wherein the publisher entity comprises a front-end tool of an end user service, and wherein each of the one or more target subscriber entities comprises a backend service for enacting the privacy request.

In a third aspect of the present disclosure, there is provided a computer program configured to perform the method disclosed above, when executed on a processor of an electronic device (such as a non-transitory computer readable medium comprising instructions that, when executed by a processor, cause the processor to perform the method disclosed above).

In a fourth aspect of the present disclosure, there is provided an electronic device comprising a processor and a memory storing a software program, wherein the software program, when executed by the processor, causes the processor to perform the method disclosed above.

DRAWINGS

Aspects of the disclosure are described, by way of example only, with reference to the following drawings, in which.

DETAILED DESCRIPTION

The present disclosure provides a privacy broker system that is based on a centralized topic pub/sub style of middleware and that enables the implementation of privacy controls across an ecosystem of services. The privacy broker system is configured to receive privacy events, each comprising a privacy request, from publisher entities (for example front-end tools of end user services) and communicate those to one or more subscriber entities (backend services) who should make changes to their behaviours and/or states in order to enact those privacy requests. By configuring the privacy broker system to utilise a pub-sub style approach in this new and unexpected way, large scale privacy control can be achieved. The system is also highly scalable, as new front-end and backend services can straightforwardly by added by registering additional publisher entities and subscriber entities. Furthermore, privacy controls may be reliably implemented across an entire ecosystem of services since a user's privacy event trigger from the front-end of one particular service can be forward to, and enacted by, backend services relating to a whole host of services who should be enacting that privacy event. Finally, the privacy broker system can be configured to monitor the progress of enacting the privacy requests and take any necessary action to improve the prospects of the privacy requests being properly enacted and to notify end users when their privacy requests have been enacted.

End user privacy controls are controls over particular aspects of end user privacy. These are explained in more detail later, but some example end user privacy controls may be control over an end user opting in or opting out of particular communications (for example, opting in or opting out of targeted advertising communications), or control over profiling (for example, opting in or out of inferences being made by services regarding additional attributes for the end user), or control over personalised suggestions of content (for example, on newspaper websites, or adverts in Market Place websites, etc) or control over deleting particular data relating to an end user (for example, payment data deletion or account data deletion), etc.

I. Service Layerings of Ecosystem

Figure 1:
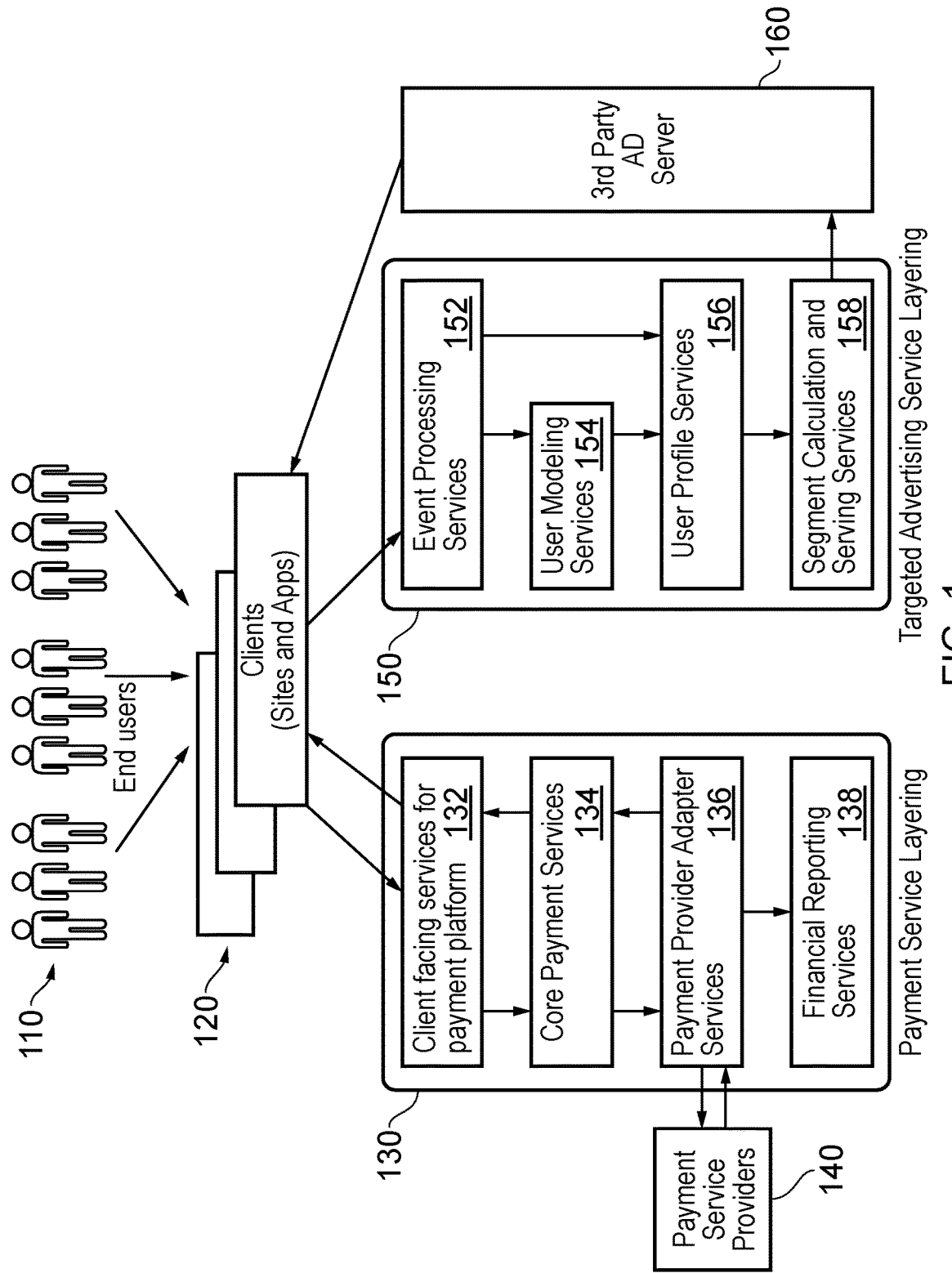
FIG. 1 shows a schematic representation of service layering patterning of a services ecosystem.

FIG. 1 shows an example representation of a service layering patterning of a services ecosystem. The ecosystem comprises a payment service layering 130 for providing an end-user payment service, and a targeted advertising service layering 150 for providing an end-user targeted advertising service. It will be appreciated that these are merely two example types of services and that the services ecosystem may additionally or alternatively comprise one or more other service layerings for providing any other end user services.

Furthermore, whilst FIG. 1 shows only two services for the sake of clarity, in practice there may be many more independent services, for example tens or even several hundreds of independent services, each with their own service layering. Each of these services may have evolved organically rather than a centralized top-down design and due to the organic nature, these services may work together as many layers of dependencies rather than strict tiers (hierarchical) as used in traditional large scale system design.

Every service may have an owner (a team) responsible for creating, operating, maintaining and deprecating the service. The owner may be any entity that is responsible for the service. Every service owner is responsible for knowing their clients and also their dependencies on other services. Additionally, service owners may justify the existence of their services through its usage and business value.

An emergent property of services ecosystems is neat service layering, wherein the services are organized in logical layers of functionality depending upon the scenarios.

The payment service layering 130 is responsible for payment transactions of end users 110. As the entry point to the payment service layer 130, the client facing services for payment platform layer 132 contains a set of services that handles all the incoming traffic to the payment platform, performs authorization and authentication of end users, and delegates invocations to downstream services. The core payment service layer 134 has a bunch of services that handles all payment related operations such as authorize, cancel, capture, reverse, get, search, etc. Furthermore, after executing all the necessary steps in the core layer, the call is passed to the next layer of pre-processing payment adapter services wherein the appropriate pre-processing payment provider adapter services layer 136 is used to have request/reply type of communication to a corresponding payment service provider 140. All these communications are passed to the financial reporting services layer 138 for financial reporting and tracking reasons.

The targeted advertising service layering 150 is responsible for providing targeted advertisements to end users 110 based on their interests and/or demographic information. When the end users 110 visit a services ecosystem client 120 (for example, a site or app), behavioural and/or location events may be generated and sent to the event processing service layer 152, which processes these events and passes the behavioural events to the user modelling services layer 154 which predicts the characteristics of end users 110. These characteristics, along with the location events from the event processing services layer 152, are used to generate the profiles for the anonymous users and complete the profile for identified end users with the help of the user profile services layer 156. The input from the user profile services layer 156 is used by the segment calculation and servicing services layer 158 to calculate the appropriate ad segment for an end user. The calculated segment is served to the 3rd party ad provider 160 for communicating to the end user.

For each end user privacy control to be implemented in the ecosystem of services, it may be important to map the corresponding service layering that is affected by the end user privacy control. Additionally, within the service layering, the appropriate layers and the services within those layers should also be mapped in order to send the privacy signals to these services.

For example, an opt out/in end user privacy control for targeted advertising should affect only the targeted advertising service layers 150 and should have nothing to do with the other servicing layers within the ecosystem. Furthermore, within the targeted advertising service layering 150, the first three layers of services (event processing service layer 152, user modelling services layer 154 and user profile services layer 156) may also a part of, for example, a personalized content service layering (another servicing layer within the ecosystem, but not represented in FIG. 1 for the sake of clarity), wherein the personalized content is served to the end users 110.

A goal of targeted advertising privacy control is to affect only the targeted advertising scenario and not the other scenarios. Accordingly, whenever an end user opts out of targeted advertising based on a particular category, the changes may include services in the user profile service layer 156 updating their Access Control List (ACL) permission model, which in turn does not allow the services in the segment calculation and servicing services layer 158 to access the attributes associated with the opted out categories. Additionally, all the existing segments calculated and stored based on the opted out categories of the end user in the segment calculation and servicing service layer 158 should be deleted.

An observation from the above scenario is that there are several services that may be affected based on a single privacy event relating to a particular privacy control (for example, the end user opting-out of targeted advertising based on a category). A similar pattern can be observed for other end user privacy controls. Based on this realisation, the present disclosure provides a centralized platform to map privacy events to the relevant services and track these privacy events to make sure that the users' choices are reflected in the system.

The rest of this disclosure is organized as follows: Section II describes the types and constraints of end user privacy controls. Section III briefly explains example architectures of the privacy broker system according to aspects of the present disclosure, which is a centralized publish/subscribe style middleware towards enabling the end user privacy controls. Then, we discuss in Section IV how the constraints mentioned in Section II are satisfied.

II. Types and Constraints for End User Privacy Controls

We broadly classify the common end user privacy controls offered to the end users into two types: stateful and stateless.

Stateful end user privacy controls are privacy controls that have a particular privacy state that should be persisted and continuously respected by the corresponding services until the state is changed. They typically represent opt out/in type privacy controls. Opt out/in of targeted advertising is one particular example of a stateful end user privacy control, wherein opt in is one privacy state and opt out is another privacy state. In this example, if the end user chooses to opt out of targeted advertising based on his demographics and interests, then this choice must be persisted. Furthermore, the demographic and interests data feeding services should reflect this choice by continuously denying the access of opted out users' datasets to the targeted advertising services, which in turn should stop the targeted advertising services from generating any new targeted advertisements for the opted out end user.

Stateless end user privacy controls are privacy controls that, once honoured, do not need to be persisted. An end user's privacy request relating to a stateless end user privacy control may be temporarily stored until the relevant services honour the user's requests. The services may honour the request exactly once, unlike in the case of stateful end user privacy controls. A data deletion privacy control is one particular example of a stateless privacy control. In this example, if an end user issues a data deletion request for all his personal data, then the relevant services that control the personal data need to execute their corresponding data deletion logic. After the successful completion of the execution, these services do not need to execute the deletion logic again until a new privacy request comes in.

A. Constraints for Stateful End User Privacy Controls

The stateful end user privacy controls may be designed and implemented to satisfy at least one of the following constraints:

1) Stateful end user privacy controls have at least two privacy states: for example, OptIN and OptOUT. The end user can choose between one of these two privacy states.

2) The front-end tool that offers the stateful end user privacy controls to the end users should always display the latest privacy states of the privacy controls persisted in the system.

3) After the relevant services start honouring the latest privacy state of the privacy controls, then the services should continue honouring the last known latest privacy states until the services are aware of next latest privacy states.

4) If the privacy states are not persisted due to failures, then the end user should be asked to retry the privacy operation later. It may be preferable to keep these to a minimum as it may result in a bad end user experience.

5) If there are multiple privacy states generated via the same stateful end user privacy control within a short time span from the same end user, then only the latest persisted privacy state needs to be eventually honoured.

B. Constraints for Stateless End User Privacy Controls

The stateless end user privacy controls may be designed and implemented to satisfy at least one of the following constraints:

1) Privacy requests generated via stateless end user privacy controls need to be temporarily stored until the relevant services honour these privacy requests.

2) After all services honour the privacy requests, depending on the nature of privacy requests honoured, it should be either removed from the system or archived for legal/non-repudiation reasons.

3) If there are multiple privacy requests generated via the same stateless end user privacy control within a short time span from the same end user, then only the latest persisted privacy request should be eventually honoured.

III. Architecture of Privacy Broker System

In this section, we describe examples of technical architecture of the privacy broker system of the present disclosure. The privacy broker system facilitates the interaction between the different services towards honouring end users' privacy choices. The communication paradigm of the architecture is loosely based on a publish/subscribe (pub/sub) model, wherein each topic of the pub/sub model represents an end user privacy control.

However, supporting the end user privacy controls in a services ecosystem such as that represented in FIG. 1 may require a specific set of requirements and constraints to be met. For example, there may be a need to distinguish between privacy events relating to stateful and stateless end user privacy controls, since those relating to stateful end user privacy controls correspond to the settings of end users which need to be continuously honoured by the backend services until the next change of privacy settings have occurred. In case of privacy events relating to stateless end user privacy controls, after the relevant services honour an end user's privacy request once, the privacy request may be removed, or archived (for example, for legal reasons).

Furthermore, real-time performance may be less critical (since from a legal perspective there is generally some time to honour privacy requests) in comparison to the reliability and consistency of privacy control application.

Moreover, the communication mode required by each backend service may be different and each service may have different configuration parameters that need to be supported by the centralized publish/subscribe system.

Additionally, it may be necessary to keep track of all services involved per privacy event in order to ensure the completeness of the privacy operations associated with that event. For example, if a deletion event occurs then all relevant services should act properly on that event.

III.1 First Example Privacy Broker System 210

Figure 2:
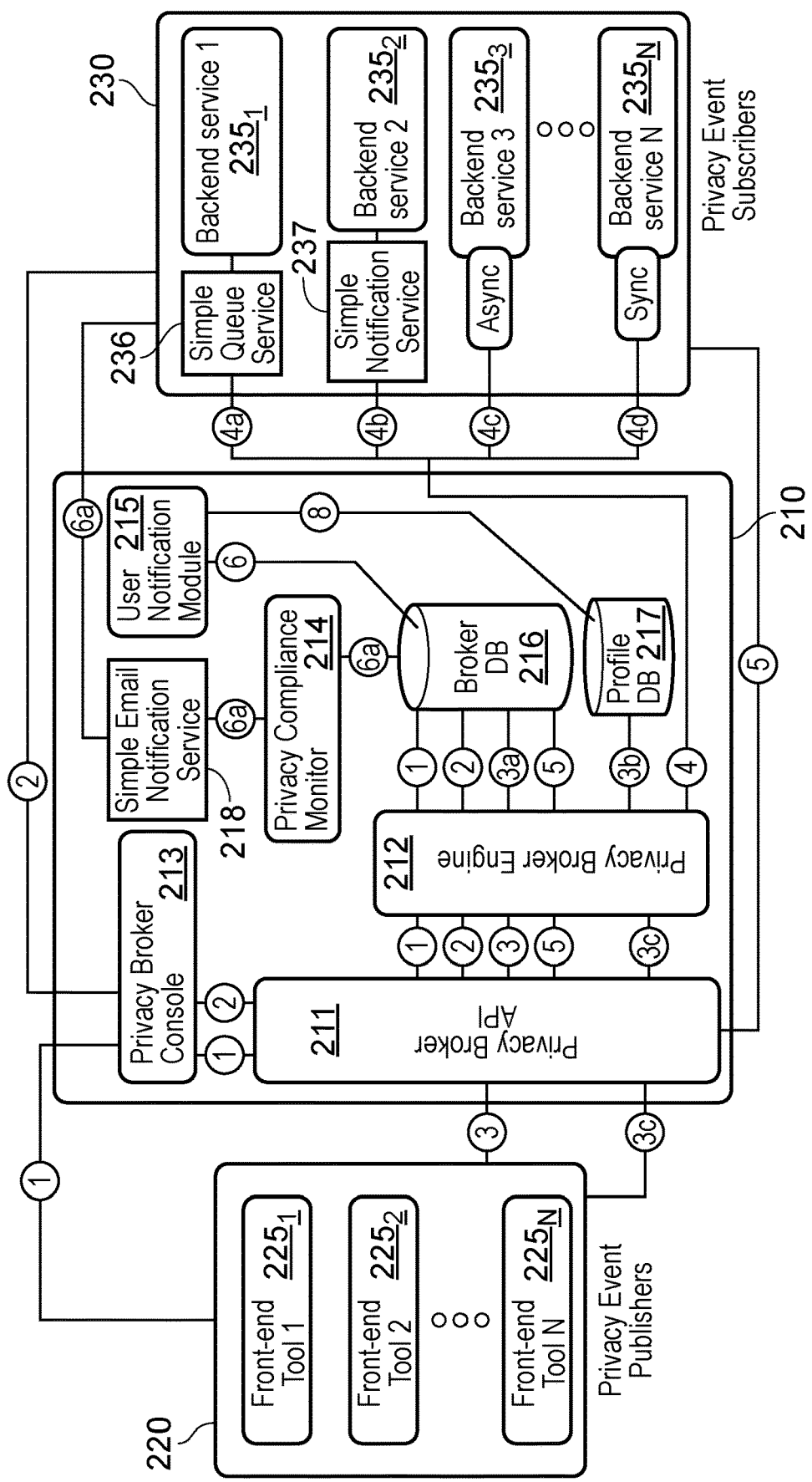
FIG. 2 shows a schematic representation of a privacy broker system in accordance with a first aspect of the present disclosure.

FIG. 2 shows a representation of a first example privacy broker system 210 in accordance with an aspect of the present disclosure. Interfacing with the privacy broker system 210 at one end are the privacy event publishers 220, which comprise front-end tools $225_n$ (FIG. 2 shows a representation of front-end tool 1 $225_1$, front-end tool 2 $225_2$ and front-end tool N $225_N$. It will be appreciated, however, this is merely one example and the privacy event publishers 220 may comprise any number of front-end tools, for example one or more front-end tools). The front-end tools $225_n$ may generate the privacy signals or privacy events for exercising end user privacy controls, for example a privacy event relating to an opt out of targeted advertising. Further details of the privacy event publishers 220 are given below in the section 'A. Privacy Event Publishers and Privacy Event Subscribers'.

Interfacing with the privacy broker system 210 at the other end are the privacy event subscribers 230, which comprise backend services $235_n$ (FIG. 2 shows a representation of backend service 1 $235_1$, backend service 2 $235_2$, backend service 3 $235_3$ and a backend service N $235_N$. It will be appreciated, however, this is merely one example and the privacy event subscribers 230 may comprise any number of backend services, for example one or more backend services). Further details of the privacy event subscribers 230 are given below in the section 'A. Privacy Event Publishers and Privacy Event Subscribers'.

As explained in more detail below, the privacy broker system 210 is configured to route privacy signalling from the privacy event publishers 220 to the appropriate privacy event subscribers 230. Furthermore, it may also be configured to track the status of the privacy event subscribers 230 with respect to honouring the users' privacy choices.

The high-level privacy broker system 210 represented in FIG. 2 comprises five core components: a) Privacy Broker API 211, b) Privacy Broker Engine 212, c) Privacy Broker Console 213, d) Privacy Compliance Monitor 214 and e) User Notification Module 215. Further details of these components are given below in sections B to F. The privacy broker system 210 represented in FIG. 2 also comprises a Broker Database 216, a Profile Database 217 and a Simple Notification Service Module 218.

A. Publishers and Subscribers

Each of the backend services $235_n$ may be a service within an ecosystem of services (for example, one of the service layerings, or one or more service layers within a service layering, represented in FIG. 1). The backend services 235n are configured to enact privacy requests of end users so that those privacy requests are honoured.

The front-end tools $225_n$ are various end user facing front-end tools of end user services that are available at clients (for example, sites and apps) 120, potentially in several countries across the world. These front-end tools $225_n$ may provide customized privacy controls to the end users 110, optionally based on the geographical region and the nature of the digital products to which they relate.

For example, the privacy controls offered on front-end tools $225_n$ for newspaper sites may be different to those on dating sites, due to the inherent nature of content of these two sites.

Furthermore, even though the GDPR will imply more similar privacy rules across Europe, there may still be room for some interpretations by national regulators that should be taken into account. For example, the general GDPR rule is that processing of data about individuals younger than age 16 should not proceed without parental consent. However, the regulation may leave room for the countries implementing the GDPR in their national laws to set the bar as low as 13 instead.

In addition to the age factor, other differences between geographical areas may include the following areas, Deletion: When is data sufficiently deleted?

Security Measures: What measures need to be in place in order for security to be at a sufficient level?

Opt out/in: When do we need opt in vs opt out?

Moreover, countries outside Europe may have different regulations. Thus, the privacy controls offered to end users by the front-end tools $225_n$ may need to vary depending on the geographical location or region of the end user and/or the geographical location or region of the service offered to the end user. Additionally or alternatively, the privacy controls offered to end users by the front-end tools $225_n$ may need to vary depending on the nature of the digital products to which the front-end tool $225_n$ relates.

The privacy event publishers 220 may generate privacy events whenever end users use privacy controls. Each privacy event corresponds to a topic in a pub/sub model. The privacy event publishers 220 can register the topic via the privacy broker console 213.

The backend services $235_n$ may be the various backend services that are part of one or more service layerings of a services ecosystem, as described earlier with reference to FIG. 1. Each of the back end services $235_n$ may be a service or a group of services. The backend services $235_n$ subscribe to the available topics via the privacy broker console 213. After one or more back end services $235_n$ receive the appropriate privacy events from the privacy broker system 210, they make appropriate changes to their services towards honouring the end users' privacy choices and may notify the completion of changes back to the privacy broker system 210 using the privacy broker API 211 (flow #5 in FIG. 2).

B. Privacy Broker Console 213

The main design goal of the broker console 213 is to be a self-service portal for the privacy event publishers 220 and the privacy event subscribers 230 to configure the privacy broker system 210 towards enabling the end user privacy controls in the ecosystem of services.

The privacy broker console 213 may be used by the privacy event publishers 220 and the privacy event subscribers 230 to register to the privacy broker system 210.

The privacy broker console 213 may be configured to be accessible only to the developers within the ecosystem of services (for example, developers employed by, or associated with, the company (or companies) that are responsible for the ecosystem of services). The common functionalities of the privacy broker console 213 may include at least one of:

Registration of new privacy event publishers 220 (for example, new front-end tools $225_n$) and/or of new privacy event subscribers 230 (for example, new back-end services $235_n$)

Registration of new privacy controls for a privacy event publisher 220

Update of privacy broker system 210 configurations for privacy event publishers 220 and/or privacy event subscribers 230

Deletion of privacy event publishers 220 and/or privacy event subscribers 230

Communications relating to the configurations of privacy event publishers 220 and privacy event subscribers 230 to the privacy broker system 210 may happen via the privacy broker console 213 as shown in data flow #1 and data flow #2 in FIG. 2 respectively. Additionally, all the configuration details given by the privacy event publishers 220 and privacy event subscribers 230 may be validated in the privacy broker engine 212 and optionally then persisted in the broker database 216. If there are any incorrect configuration details detected by the privacy broker engine 212, then appropriate error messages may be shown to the corresponding privacy event publishers 220 or privacy event subscribers 230.

The configuration parameters for privacy event publishers 220 and privacy event subscribers 230 that may be stored in the broker database 216 via the privacy broker API 211 are described in Table I, which is set out in the section 'Tables' which follows this detailed description. Example configurations of the privacy event publishers 220 and the privacy event subscribers 230 stored in the broker database 216 are shown in Table II and Table III respectively.

It can be seen from Table III and FIG. 2 that each of the represented backend services $235_n$ has a different mode of communication (subscription type). In particular, backend service 1 $235_1$ has an Amazon® Simple Queue Service (SQS) mode of communication via the SQS module 236, backend service 2 $235_2$ has an Amazon® Simple Notification Service (SNS) mode of communication via the SNS module 237, backend service 3 $235_3$ has an asynchronous API call mode of communication and backend service N $235_N$ has a synchronous API call mode of communication. However, these are merely non-limiting examples and each of the backend services $235_n$ may have any suitable mode of communication.

C. Privacy Broker API 211

The main design goal for the privacy broker API 211 is to provide endpoints for the privacy event publishers 220, the privacy event subscribers 230 and the privacy broker console 213 to interact with the privacy broker engine 212.

The privacy broker API 211 may be mostly used by the privacy event publishers 220 (such as the front-end tools $225_n$ that display privacy settings to the end users) to publish the privacy events and by the privacy event subscribers 230 to send completion messages after they honour the end users' privacy choices.

The communications of the privacy event publishers 220 and the privacy event subscribers 230 to the privacy broker API 211 endpoints may be guarded with the help of Software Development Kits (SDKs). SDKs may ensure the communication from the broker clients (the privacy event publishers 220 and privacy event subscribers 230) are happening in a consistent (all clients using same protocols and messaging format), secure (all clients are authenticated and authorized) and reliable way (number of retries in case of not able to reach the broker).

Privacy event publisher SDKs may be responsible for sending synchronous privacy requests when end users are using stateful privacy controls and asynchronous privacy requests when end users are using stateless privacy controls from the privacy event publishers 220.

Privacy event subscriber SDKs may be responsible for sending a synchronous status notification that indicates the current status of progress towards honouring the end users' privacy choices.

Both the SDKs may use the gRPC protocol to communicate with the privacy event publishers 220 (although any other suitable protocol may alternatively be used) and the privacy event subscribers 230 may use protocol buffer as the messaging format (although any other suitable messaging format may alternatively be used).

D. Privacy Broker Engine 212

The privacy broker engine 212 is responsible for routing the privacy events from privacy event publishers 220 to the privacy event subscribers 230 and may also be responsible for persisting the privacy settings and requests.

The purposes of the privacy broker engine 212 are the following:

Match the incoming privacy events from privacy event publishers 220 to appropriate privacy event subscribers 230.

Disseminate the privacy events from the privacy event publishers 220 to the privacy event subscribers 230.

The privacy broker engine 212 may optionally also process the incoming communications from broker clients (such as the privacy event publishers 220 and the privacy event subscribers 230) and update the privacy broker system 210 configuration and/or user profile database 217 accordingly.

1) Processing Logic for the Communications Coming via the Privacy Event Console 213: Developers from Publisher (for example, front-end tools $225_n$) and/or Subscriber (for example, backend services $235_n$) teams may provide configuration parameters via the privacy broker console 213 to the privacy broker system 210 (flow #1 and flow #2 in FIG. 2). The parameters of configuration may be validated with the help of corresponding configuration schemas and with routine input validation. After validation, the broker configuration database (broker DB 216) may be updated. Example privacy event publisher 220 and privacy event subscriber 230 configurations stored in the broker database 216 are shown in Table II and Table III.

2) Processing Logic for the Privacy Events Coming from Privacy Event Publishers 220: Privacy events may be communicated from a front-end tool 225 to the privacy broker engine 212 via the privacy broker API 211 (flow #3 in FIG. 2). Privacy events comprise an identifier of the end user (User ID) and a privacy request relating to an end user privacy control. The privacy request relates to a particular user, or individual, so the inventors have realised that the User ID should uniquely identify the particular, individual user to which the privacy request relates. The privacy broker engine 212 may classify the privacy request as relating to stateful or stateless end user privacy controls, as described in Section II above. For both stateful and stateless end user privacy controls, the privacy broker engine 212 will determine one or more privacy event subscribers $235_n$ based on the privacy request and notify those one or more privacy event subscribers $235_n$ of the privacy event (explained in more detail below, in section '4) Disseminating the privacy events to the appropriate privacy event subscribers'). Optionally, the privacy broker engine 212 may also store the privacy event in the broker database 216 (flow #3a in FIG. 2). By storing the privacy event in the broker database 216, the privacy broker engine 212 may also track the progress of the privacy event subscribers 230 towards honouring the end users' privacy choices.

Table IV shows an example privacy events table in the broker database 216. The 'Event ID' may be any form of unique identifier of the privacy event. The 'publisher ID' may be any form of unique identifier of the publisher from which the privacy event was received (for example, from which front-end tool $225_n$ the privacy event was received). The 'unique user ID' may be any form of unique identifier of the end user relating to the privacy request.

The 'request topic type' is indicative of the privacy request relating to the end user (for example, a request for payment data deletion, or a request for opt out of target advertising, etc). The privacy request may be something that the end user has requested via the front-end tool $225_n$, or may be something that the front-end tool has determined to be potentially necessary, for example an opt-out of target advertising in view of the age of the end user, as may be necessary according to some national privacy laws (as explained earlier).

The 'request status' offers various status options that can be used to track the status of the privacy request. Some examples of potential request statuses for privacy events are identified in Table IV. These request statuses, and others, are explained in more detail in Table V.

Furthermore, for privacy requests relating to stateless end user privacy controls, the corresponding privacy event publisher may be notified that their privacy event will be eventually honoured as soon as the privacy event is written in the broker database 216 (flow #3c in FIG. 2). This in turn may be helpful to enable the privacy event publisher to display appropriate information to the end users. If the privacy request relates to a stateful end user privacy control, the privacy broker engine 212 may store the desired privacy state for the stateful end user privacy control (for example, opt-in or opt-out) in the corresponding end user's profile in the profile database 217 (flow #3b in FIG. 2) and then notify the relevant privacy event publisher (flow #3c in FIG. 2).

Reasons for writing the desired privacy state to the profile database 217 may be: a) the profile database 217 can serve as a source of truth for end users' profile attributes and settings for all back-end services $235_n$. Hence, it may be made relatively easy to implement filtering mechanisms on top of profile attributes based on opt out preferences when these preferences are stored along with the end user profile, and/or b) it may be preferable to avoid multi-master complications and keep only one master/source of truth for all opt out preferences of end users to make it as simple as possible.

For example, if the privacy event comprises a privacy request that relates to a stateful end user privacy control, for example to opt out of targeted advertising based on age and gender, then the privacy broker engine 212 notifies the relevant privacy event subscriber(s) 230 of the privacy event as explained earlier and preferably also updates the corresponding end user profile in the profile database 217 with the end user opt out preferences. The privacy event subscriber(s) 230 may then retrieve the end user's desired privacy state for the stateful end user privacy control from the profile database 217 so that the desired privacy state may be implemented.

3) Matching the privacy events with privacy event subscribers 230: For each received privacy event (for example, those shown in Table IV), one or more privacy event subscribers relevant to the privacy event (for example, one or more target subscribers) are determined, for example by a simple lookup on the request topic type on the privacy event subscribers configuration shown in Table III. Thus, after receiving a privacy event from one of the privacy event publishers 220, the privacy broker engine 212 determines, based on the privacy request in the privacy event, one or more target privacy event subscribers 230 for the privacy event.

With the target list of privacy event subscribers 230 for a privacy event, the privacy broker engine 212 may create and store in the broker database 216 a subscription notification progress table as shown in the Table VI. The default status for the 'progress status' may be INIT for a newly stored privacy event. Examples of various progress status options that may be set in the subscription notification progress table and the corresponding definitions are given in the Table VII.

4) Disseminating the privacy events to the appropriate privacy event subscribers 230: The privacy broker engine 212 may use the pairing between the Event ID and Subscriber ID(s) for a privacy event in Table VI and the URI, Failure Retry Count and Retry Delay information in Table III associated with the relevant Subscriber ID(s), to communicate the privacy event to all subscribers identified in Table VI for that privacy event (flows #4, #4a, #4b, #4c and #4d in FIG. 2). It can be seen that in the example of Table VI, the privacy event identified by Event ID 123442 is to be communicated to two privacy event subscribers 230 (Subscriber IDs 12344, 12346), since those two privacy event subscribers 230 are subscribed to request topic type 'Account Data Deletion' (which is indicative of the privacy request of privacy event 123442).

The privacy broker engine 212 may communicate the privacy event to the one or more appropriate privacy event subscribers 230 (the target privacy event subscribers) by communicating the identifier of the end user and the privacy request to the one or more appropriate privacy event subscribers. Other information relating to the privacy event may also be communicated, for example the event ID and/or the publisher ID. This communication may take place using any suitable communications protocol and/or standards.

The privacy broker engine 212 may also update the statuses for each privacy event to either SENT or SEND-FAILED in Table VI and INPROGRESS or SOMEFAILED in Table IV. Furthermore, when each of the one or more privacy event subscribers 230 send acknowledgement signals and/or completion signals (flow #5 in FIG. 2) back to the privacy broker system 210, then the privacy broker engine 210 may update the progress status in Table VI to ACKNOWLEDGED and COMPLETED respectively for those privacy event subscribers 230.

Moreover, if the broker database 216 has COMPLETED status from all the privacy event subscribers 230 for a privacy event, then the privacy broker engine 212 may update the request status field of Privacy Event Requests Table IV to COMPLETED.

Thus, the value set for the 'progress status' can be indicative of progress towards the one or more privacy event subscribers 230 enacting the privacy request. Some examples of potential request statuses for privacy events are identified in Table IV. These request statuses, and others, are explained in more detail in Table V.

E. Privacy Compliance Monitor 214

The privacy compliance monitor 214 is responsible for tracking the statuses of the privacy event subscribers 230 towards enacting the privacy requests and therefore honouring the end users' privacy choices.

The privacy compliance monitor 214 may monitor the status column in Table VI and, optionally with the help of Table III, it may scan for the privacy events that have not been completed within the expected completion time (the 'time to honour' in Table III and Table VI). In this way, it may identify, using the values set for the 'progress status' (i.e., the progress status identifiers) and 'time to honour' in Table VI, any privacy subscriber entities 230 to whom a privacy event was communicated, but who have not enacted the privacy request within a threshold period of time (the expected completion time). On identifying a privacy event subscriber that has not enacted the privacy request within the threshold period of time, it may re-communicate the privacy event to the privacy event subscriber. In this way, the privacy event subscribers 230 will be allowed the threshold period of time from when the privacy event is most recently communicated to them to enact the privacy request. In the examples shown in Tables III and VI, the threshold period of time is typically 1 day ('time to honour'), although it may alternatively be set to any suitable value. Optionally, one or more privacy event subscribers 230 may change or update their 'time to honour' via the privacy broker console 213 (flow #2 in FIG. 2), for example in view of some technical failure or upgrade in their system.

The privacy compliance monitor 214 may be further configured to, in the event that the number of times a privacy event has been re-communicated to a particular privacy event subscriber exceeds a re-communication threshold (i.e., a maximum allowable number of retries is reached), look up the corresponding contact details (for example, email and/or mobile telephone number) for an entity (such as a team or administrator) responsible for that particular privacy event subscriber from the Subscriber Configuration Table III and send a failure alert message(s) to them (flow #6a in FIG. 2). Additionally, or alternatively, the privacy compliance monitor 214 may also update the progress status to FAILED in Table VI. It will be seen that flow #6a in FIG. 2 takes place via the Simple Notification Service email module 218, although it will be appreciated that this is merely one non-limiting technique by which the privacy compliance monitor 214 may send the messages and that any other suitable techniques may alternatively be used.

By monitoring the progress towards the privacy request being enacted in this way, the prospects of the privacy request being properly enacted may be improved by virtue of the re-communication of privacy events. Furthermore, where there is some sort of failure that might cause the privacy request not to be enacted until a change or repair is made to the one or more privacy event subscribers 230, this may also be identified by virtue of the re-communication threshold. By then communicating a failure alert, the prospects of resolving the problems may also be improved. Thus, error identification and diagnostics in the enactment of privacy controls may be improved.

F. User Notification Module 215

The user notification module 215 may monitor the request status column in Table IV. For each privacy event that has status COMPLETED (which corresponds to all of the one or more target privacy event subscribers 230 having enacted, or COMPLETED, the privacy request, as explained earlier), the user notification module 215 may communicate a confirmation of enactment to the end user to confirm that their privacy request has been enacted. To this end, the user notification module 215 may find the corresponding publisher ID to the privacy event and then look up its preferred asynchronous notification type in Table II (flow #7 of FIG. 2). Further details of the notification types are given in Table VIII.

If the preferred asynchronous notification type is Email and/or SMS, the corresponding contact attributes may be fetched from the profile database 217 using the Unique User ID that is associated with the relevant Event ID in Table IV (flow #8 of FIG. 2). This contact information in turn may help the user notification module 215 to deliver the confirmation of enactment messages to appropriate end users. If the asynchronous notification type is 'In-client', then the corresponding endpoints may be fetched directly from the Table II.

III.2 Second Example Privacy Broker System 410

FIG. 2 shows a representation of a second example privacy broker system 410 in accordance with an aspect of the present disclosure. It should be noted that like reference numerals in FIGS. 2 and 4 represent the same features, flows and entities.

Figure 4:
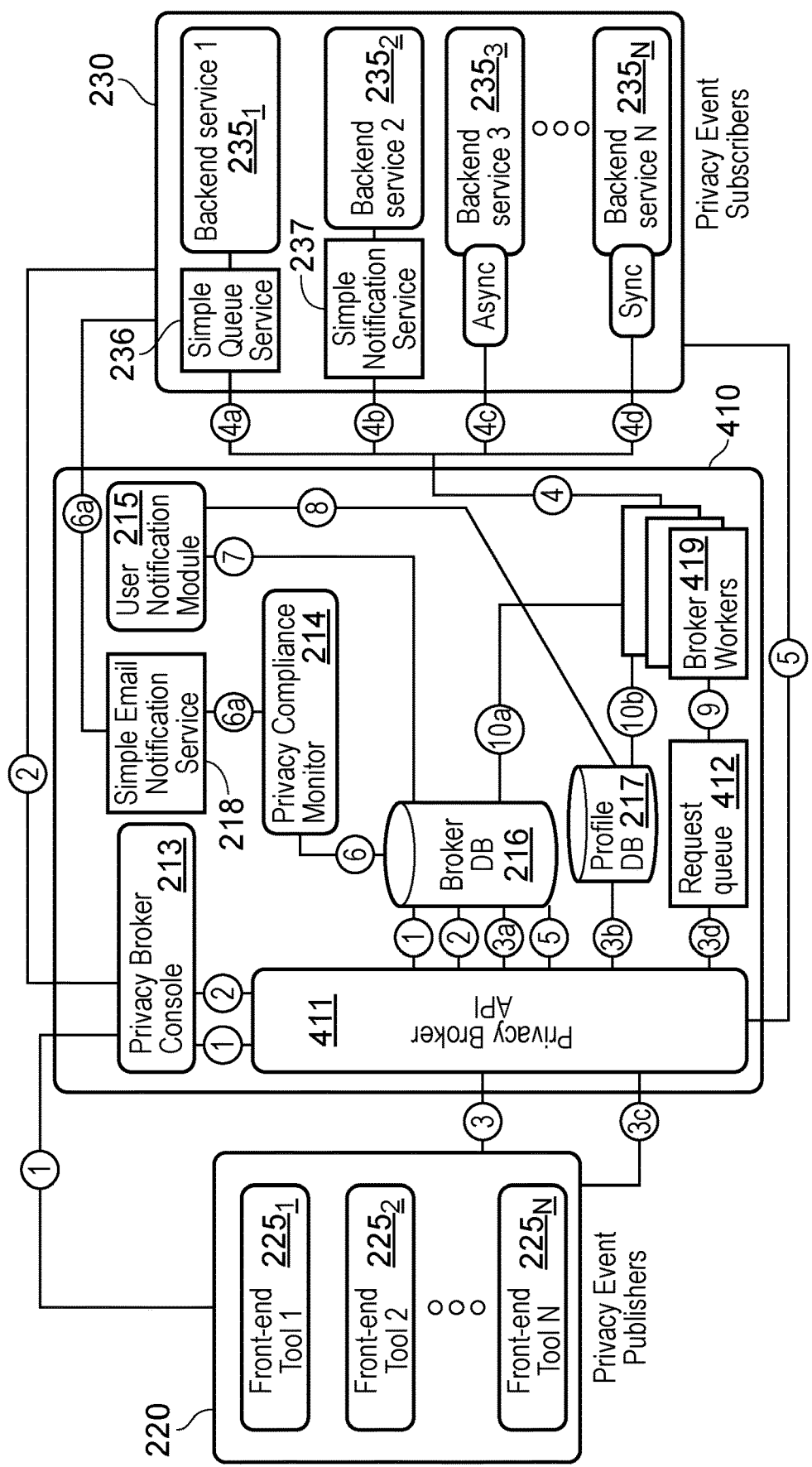
FIG. 4 shows a schematic representation of a privacy broker system in accordance with a second aspect of the present disclosure.

In particular, the privacy event publishers 220 and the privacy event subscribers 230 represented in FIG. 4 are the same as those described above with reference to FIG. 2.

As with the privacy broker system 210 described above, the privacy broker system 410 represented in FIG. 4 is configured to route privacy signalling from the privacy event publishers 220 to the appropriate privacy event subscribers 230. Furthermore, it may also be configured to track the status of the privacy event subscribers 230 with respect to honouring the users' privacy choices. However, the particular implementation of the privacy broker system 410 represented in FIG. 4 is different to the particular implementation of the privacy broker system 210 described above.

The high-level privacy broker system 410 represented in FIG. 4 comprises a Notification Module 215, a Broker Database 216, a Profile Database 217 and a Simple Notification Service Module 218, the functionality of which is described in detail above with reference to FIG. 2 and shall not be described again here. However, rather than having the Privacy Broker API 211 and the privacy broker engine 212 of the first example privacy broker system 210, the privacy broker system 410 represented in FIG. 2 instead has a privacy broker API 411, a request queue 412 and broker workers 419, the principle operations of which are described below. It will be appreciated from the description below that in the second example privacy broker system 410 the broker workers 419 function to determine the target subscriber entities for a privacy event and communicate the privacy event to the target subscriber entities, rather than the broker engine 212 of the first example privacy broker system 210.

The main design goal for the privacy broker API 411 is to provide endpoints for the privacy event publishers 220, the privacy event subscribers 230 and the privacy broker console 213.

The privacy broker API 411 may be mostly used by the privacy event publishers 220 (such as the front-end tools 225$_n$ that display privacy settings to the end users) to publish the privacy events and by the privacy event subscribers 230 to send completion messages after they honour the end users' privacy choices.

The communications of the privacy event publishers 220 and the privacy event subscribers 230 to the privacy broker API 411 endpoints may be guarded with the help of Software Development Kits (SDKs). SDKs may ensure the communication from the broker clients (the privacy event publishers 220 and privacy event subscribers 230) are happening in a consistent (all clients using same protocols and messaging format), secure (all clients are authenticated and authorized) and reliable way (number of retries in case of not able to reach the broker).

Privacy event publisher SDKs may be responsible for sending synchronous privacy requests when end users are using stateful privacy controls and asynchronous privacy requests when end users are using stateless privacy controls from the privacy event publishers 220.

Privacy event subscriber SDKs may be responsible for sending a synchronous status notification that indicates the current status of progress towards honouring the end users' privacy choices.

Both the SDKs may use the gRPC protocol to communicate with the privacy event publishers 220 (although any other suitable protocol may alternatively be used) and the privacy event subscribers 230 may use protocol buffer as the messaging format (although any other suitable messaging format may alternatively be used).

First, the configuration parameters for privacy event publishers 220 and privacy event subscribers 230 (described earlier with respect to the privacy broker system 210) may be stored in the broker database 216 via the privacy broker API 411. These configuration parameters are described in Table I. Example configurations of the privacy event publishers 220 and the privacy event subscribers 230 stored in the broker database 216 are shown in Table II and Table III respectively.

The privacy broker API 411 is also responsible to entering into the request queue 412 requests relating to privacy events so that the broker workers 419 can carry out those requests in order to forward the privacy events to target subscriber entities. Furthermore, the privacy broker API 411 may also persist in the broker DB 216 and/or the profile DB 217 data relating to the privacy events to enable the broker works 419 to carry out requests in the request queue 412.

For example, when a privacy event is received in flow #3 from a privacy event publisher 220, the privacy broker API 411 may enter data relating to the privacy event into the broker DB 216 (flow #3a) and optionally also the profile DB 217 (flow #3b). The data relating to the privacy event stored in the broker DB 216 may include the data represented in Table IV and described earlier (for example, an 'Event ID', 'Publisher ID', 'unique user ID', 'request topic type' and 'request status'). For privacy events relating to stateless end user privacy controls, the privacy broker API 411 may also store the desired privacy state for the stateful end user privacy control in the corresponding end user's profile in the profile database 217 (as described earlier with reference to the first privacy broker system 210). The privacy broker API may also enter a worker request into the request queue 412 (flow #3d), to be picked up by the broker works 419 (as explained later).

The request queue 412 may be a straightforward queue, from which broker workers 419 may pick-up worker requests in a first-in, first-out fashion. Alternatively, any other form of queuing system may also be used, for example prioritising particular types of worker request may take priority in the request queue 412 so that they are picked up by broker workers 419 more quickly than other types of request. In a further alternative, the privacy broker API 411 may alternatively be configured to communicate worker requests to the broker workers 419 in any other suitable way.

The broker workers 419 may comprise one broker worker or a plurality (two or more) broker workers operating in parallel. Each broker worker may be implemented as a relatively simple module, configured to pick-up worker requests from the request queue 412 and enact them by looking up data in the broker DB 216 and the profile DB 217 and communicating the privacy event to the target subscriber entities as necessary. For example, when the privacy broker API 411 enters a worker request into the request queue 412, that worker request may comprise at least an event ID. When a broker worker 419 picks up the worker request (flow #9), they may look up the privacy event in Table IV of the broker DB 216 (flow #10a) and determine from the request status what action to take. At first, the request status may be "INIT", in which case the broker worker 419 may determine the target subscriber(s) for the privacy event, for example by looking up the relevant privacy event subscribers 230 in Table III of the broker DB 216. Optionally, for stateful privacy events, the broker worker 419 may also look-up the desired privacy state stored in the profile DB 217 (flow #10b), which enables the profile database 217 to serve as a source of truth for end users' profile attributes. Based on the looked-up data, the broker worker 419 may then communicate the privacy event to the target privacy event subscriber(s) 230 (flows #4a, #4b, #4c and #4d in FIG. 4), analogously to the communication process described earlier with reference to the broker engine 212.

The broker worker 419 may also update the progress status in the broker DB 216 to either SENT or SEND-FAILED in Table VI and update the event status to either INPROGRESS or SOMEFAILED in Table IV.

When each of the target subscriber(s) send acknowledgement signals and/or completion signals (flow #5 in FIG. 2) back to the privacy broker system 210, the privacy broker API 411 may update the progress status in Table VI to ACKNOWLEDGED and COMPLETED respectively for those target subscribers and also enter a new worker request into the request queue 412. Again, the worker request may comprise at least the event ID and when a broker worker 419 picks up the worker request, it may check the "Progress Status" in Table VI of the broker DB 216 for that event. If all of the target subscriber entities are recorded as COMPLETED in Table VI, the broker worker 419 may update the request status field of Table IV to COMPLETED. If not all of the target subscriber entities are recorded as COMPLETED in Table VI, then the broker worker 419 may take no further action. Consequently, if there are a number of target subscribers, the broker workers 419 may pick up a number of worker requests from the request queue 412 and take no further action because those requests have been triggered by the first few target subscriber entities signalling their enactment of the privacy request. Finally, only when all of the target subscriber entities have signalled their enactment of privacy request do the broker workers 419 take action to update Table IV to record the privacy event as COMPLETED.

The privacy compliance monitor 214 and user notification module 215 may then track these statuses as described earlier with reference to the first privacy broker system 210.

A benefit of implementing broker workers 419 to determine the target subscriber(s) and communicate the privacy event to them may be that a plurality of relatively simple broker workers 419 can be implemented to operate in parallel, thereby improving the speed of processing of privacy events. Furthermore, if there is a failure in one of the broker workers, or if one of the broker workers takes a long time to deal with a worker request from the request queue 412, the other broker workers can continue to deal with worker requests from the request queue 412, thereby minimising the overall impact of the failing/slow broker worker. This may be particularly useful for scaling the privacy broker system 410, since in may enable the system to handle a high volume of incoming privacy events by minimising the effect of failures in the privacy broker system 410.

It will be appreciated that whilst two particular implementations of privacy broker systems have been described above, those particular implementations are not limiting and the privacy broker system of the present disclosure may be implemented in any suitable way to match target subscriber entities to privacy events and forward the privacy events to those target subscriber entities.

IV. Discussion on Satisfying the Privacy Control Constraints

The following considers how the constraints for privacy controls identified earlier in section II may be met by the first privacy broker system 210 and the second privacy broker system 410 of the present disclosure.

A. Discussion on Constraints for Stateful End User Privacy Controls

1) Constraint 1: By utilising the privacy broker systems 210 and 410 of the present disclosure, it may be straight forward for a front-end tool $225_n$ to offer these settings to the end users. The front-end tools $225_n$ may be configured to ensure that there are no intermediate states such as 'unknown'.

2) Constraint 2: After the privacy request gets persisted in the profile database 217 and the broker database 216, whenever the end user logs into a front-end tool $225_n$ and views the privacy settings/notification pages, then the front-end tool $225_n$ may look up the status field in Table IV and/or Table VI in the broker database 216 to know the status of the privacy event and can display a user experience (UX) message accordingly. If any failures occur before flow #3c in FIG. 2, then the end user may be asked to retry the privacy event operation.

3) Constraint 3: The profile database 217 should always have the latest state of a privacy control. When a privacy event changes a privacy state of a stateful end user privacy control, the privacy broker system 210 communicates the identifier of the end user and the privacy request to the appropriate privacy event subscribers 230 and may indicate that there has been a change of state to the stateful end user privacy control. The relevant privacy event subscribers 230 may then fetch the latest privacy state from the profile database 217 and act according to only the latest state.

4) Constraint 4: The privacy broker systems 210 and 410 of the present disclosure may render this constraint straightforward to achieve. If any failures occur before flow #3c in FIG. 2, then the end users can be asked to retry the privacy operation. Any failures that occur after flow #3c may be resolved without the knowledge of the end user.

5) Constraint 5: If there are multiple privacy states persisted within a short time span for the same stateful end user privacy control, the privacy broker engine 212 or broker workers 419 can send notifications for all the persisted privacy states to the corresponding backend services $235_n$, and the backend services $235_n$ can continue fetching the latest privacy state from the profile database 217 until it stops receiving the notification from the privacy broker engine 212. Thus, the latest privacy state will be eventually honoured.

Figure 3:
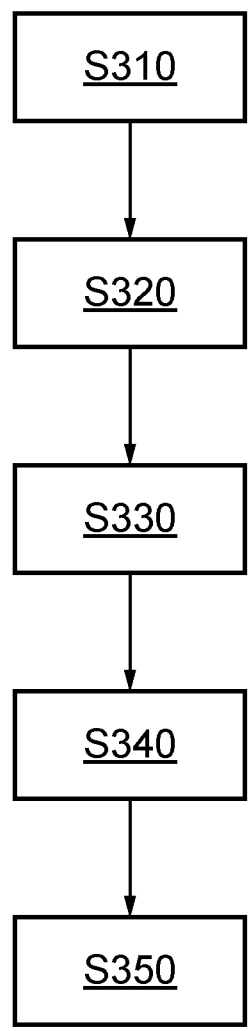
FIG. 3 shows an example representation of a method for managing end user privacy controls in accordance with an aspect of the present disclosure.

FIG. 3 shows an example representation of a method that can be performed by either of the privacy broker systems 210 and 410, or by any other suitable system, for managing end user privacy controls in accordance with an aspect of the present disclosure.

In step S310, the privacy broker system 210 or 410 receives from a privacy event publish 220 (a front-end tool $225_n$) a privacy event.

In step S320, the privacy broker system 210 or 410 determines one or more privacy event subscribers 230 (one or more back-end services $235n$) to send the privacy event to (i.e., one or more target privacy event subscribers 230). Optionally, the privacy broker system 210 or 410 may also determine if the privacy event relates to a stateless end user privacy control or a stateful end user privacy control.

In step S330, the privacy broker system 210 or 410 communicates the privacy event to the one or more target privacy event subscribers 230 (for example, by communicating a user ID uniqely indicative of the end user and the end user's privacy request relating to the end user privacy control).

Optionally, in step S340, the privacy broker system 210 or 410 stores the privacy event in the broker DB 216. If the privacy broker system 210 or 410 has determined in step S320 that the privacy event relates to a stateful end user privacy control, the privacy broker system 210 or 410 may also store the end user's desired privacy state in the end user profile DB 217 and instruct the one or more target privacy subscribers 230 to obtain the desired privacy state from the end user profile DB 217.

Optionally, in step S350, the privacy broker system 210 or 410 may receive from a target subscriber entity an acknowledgement notification indicative of having received the privacy event but not yet enacted it, or a completion notification indicative of the target subscriber entity having enacted the privacy request, and update the progress status in the broker DB 216 accordingly.

The skilled person will readily appreciate that various alterations or modifications may be made to the above described aspects of the disclosure without departing from the scope of the disclosure. By way of example, FIGS. 2 and 4 show representations of the privacy broker systems 210 and 410 comprising multiple separate modules or entities, such as the privacy broker engine 212, the privacy broker API 211 or 411, the broker DB 216, the profile DB 217, the broker workers 419, etc. However, any suitable distribution of functionality between different functional units or processors may be implemented, with only two particular implementations represented in FIGS. 2 and 4 for the sake of clarity. For example, each of the privacy broker systems 210 and 410 may comprise a single entity or module that is configured to perform all of the functionality of the privacy broker systems 210 and 410 described above. Alternatively, the privacy broker systems 210 and 410 may each comprise a plurality (i.e., two or more) interconnected entities or modules that are configured to together perform the functionality of the privacy broker systems 210 and 410 described above.

The different entities or modules of the privacy broker systems 210 and 410 represented in FIGS. 2 and 4 may all be co-located (potentially within the same physical entities, such as all part of an electronic device such as a server or computer) or located in different geographical places. For example, the privacy broker engine 212 may be in one geographical location (for example, part of an electronic device in one place) and the broker DB 216 and profile DB 217 may be in a different geographical location (for example, in a different country). Furthermore, whilst the broker DB 216 and profile DB 217 are described as separate entities, they may alternatively be different parts of the same entity (for example, different areas within the same database, one area for data relating to the privacy broker and the other for data relating to the end user).

The privacy broker console 213 and/or the privacy broker API 211 and/or privacy broker API 411 are optional entities or modules within the privacy broker system 210. In an alternative, the privacy broker engine 212 or broker workers 411 may interface, and communicate, with the privacy event publishers 220 and privacy event subscribers 230 in any other suitable way. Likewise, the broker DB 216 and profile DB 217 are also optional, in that the privacy broker engine 212 may communicate the privacy events to the privacy event subscribers 230 in any suitable way and not then monitor the progress towards enactment of the privacy requests.

Likewise, the privacy compliance monitor 214 and the user notification module 215 are also optional.

The various communications paths and interfaces in FIGS. 2 and 4 are all represented as direct interfaces or paths between different modules and entities. However, it will be appreciated that there may alternatively be any number of intermediate modules or entities, such as routers, proxies, etc, etc. The communications between the different modules and entities may be carried out using any suitable communications architectures, protocols and standards.

Whilst not represented in FIGS. 2 and 4, it will be appreciated that the privacy broker systems 210 and 410 may each comprise one or more processors (such as microprocessors) and/or logic (such as programmable logic, field programmable gate arrays (FPGAs), etc) and/or memory (for example volatile or non-volatile memory, such as RAM, ROM, EPROM, Flash, etc) for performing the above functionality.

The aspects of the present disclosure described in all of the above may be implemented by software, hardware or a combination of software and hardware. For example, the functionality of the privacy broker systems 210 and 410 may be implemented by software comprising computer readable code, which when executed on the processor of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way. In a further example, the functionality of the privacy broker system may be carried out by an electronic device configured in any suitable way (for example, by virtue of programmable logic, or fixed logic, etc) to perform such functionality (such as one or more servers, one or more desktop computers, one or more laptop computers, etc).

TABLES

TABLE I

CONFIGURATION PARAMETERS FOR PUBLISHERS AND SUBSCRIBERS

| Parameters | Definition |
|---|---|
| Publisher ID | An identifier (for example, a number, or code, or alpha-numeric code) that uniquely identifies the front-end tool that provides privacy controls within ecosystem of services. |
| Topic Type | The type of privacy control that may be used by the end users within that publisher ID. |
| Async Notification Type | Mode of notifications to the end users about the status of their privacy requests triggered via the privacy controls. Refer to Table VIII for different types of notifications. |
| Retry Count | Number of retries that need to be performed in case the privacy broker system is not reachable from the privacy event publisher. |
| Retry Delay Gap | Time difference between two successive failure retries. |
| Subscriber ID | An identifier (for example, a number, or code, or alpha-numeric code) that uniquely identifies a service or a group of services that needs to make changes to their internal behaviours and states towards honouring the users' privacy choices. |
| Time to Honour | Total time taken for the backend services to acknowledge, make appropriate changes to their services, and send completion signal to the privacy broker system. The maximum value for time to honour for a backend service corresponding to a topic type may be set according to ecosystem requirements, or according to any other requirements. |
| Contact | Email addresses for alert messages in presence of failures such as the privacy broker engine being unable to reach the backend services or the privacy broker engine not receiving the completion signal within mentioned Time to Honour. May alternatively be an address for any other suitable communications mechanism, such as a telephone number or IP address, etc. |
| Subscription Type | Mode of communication to the backend service. In this example, four options are supported towards addressing a wide variety of services: a) Synchronous call, b) Asynchronous call, c) Amazon ® Simple Queue Service and d) Amazon ® Simple Notification Service, although additional or alternative options may be supported. |
| URI | Endpoints offered by the backend services to the privacy broker system to send the privacy events. |

TABLE II

SAMPLE PUBLISHER CONFIGURATION IN THE BROKER DATABASE

| Publisher ID | Request Topic Type | Async Notification Type | Retry Count | Retry Delay Gap |
|---|---|---|---|---|
| 1234 | Payment Data Deletion | {User Email, User Mobile SMS} | 3 | 2 seconds |
| 1234 | Behavioural Data Deletion | {User Email, User Mobile SMS} | 3 | 3 seconds |
| 1234 | Opt Out of Targeted Advertising (based on age & gender) | {In-client with endpoint address} | 3 | 2 seconds |

TABLE III

SAMPLE SUBSCRIBER CONFIGURATION IN THE BROKER DATABASE

| Subscriber ID | Request Topic Type | Subscription Type | URI | Time to Honour | Failure Retry Count | Retry Delay Gap | Contact |
|---|---|---|---|---|---|---|---|
| 12344 | Payment Data Deletion | {Async API call} | https://payment.domainname/UUserID/Delete | 1 day | 5 | 2 seconds | a@schibsted.com |
| 12346 | Behavioural Data Deletion | {Amazon SQS} | https://sqs.eu-west.amazonaws.com/queueID | 1 day | 4 | 3 seconds | d@schibsted.com |
| 12347 | Location Data Deletion | {Sync API Call} | https://sqs.eu-west.amazonaws.com/queueID | 6 hours | 3 | 5 seconds | g@schibsted.com |
| 12348 | Opt Out of Targeted Advertising (age, gender) | {Amazon SNS} | https://sns.eu-west.amazonaws.com/snsID | 1 day | 3 | 5 seconds | j@schibsted.com |

TABLE IV

SAMPLE PRIVACY EVENTS IN THE BROKER DATABASE

| Event ID | Publisher ID | Unique User ID | Request Topic Type | Request Status |
|---|---|---|---|---|
| 123453 | 1234 | A8910 | Opt Out of Targeted Advertising (age) | INIT |
| 123442 | 1234 | A1235 | Account Data Deletion | SOMEFAILED |
| 123461 | 1234 | B1235 | Payment Data Deletion | COMPLETED |
| 123430 | 1234 | A4567 | Opt Out of Targeted Advertising (gender) | INPROGRESS |

TABLE V

STATUS FIELD OPTIONS IN THE PRIVACY EVENTS TABLE IN BROKER DATABASE

| Request Status Options | Definition |
|---|---|
| INIT | Progress details are written to the broker database, privacy event not yet sent to the subscriber |
| INPROGRESS | The request is in progress by the broker engine or by the subscribers |
| COMPLETED | User's choice is honoured by all the necessary services |
| SOMEFAILED | At least one of the necessary has failed to either honour or send the completion notification |

TABLE VI

SAMPLE SUBSCRIPTION NOTIFICATION PROGRESS TABLE IN THE BROKER DATABASE

| Event ID | Subscriber ID | Time to Honour | Progress Status |
|---|---|---|---|
| 123453 | 12348 | 1 day | INIT |
| 123442 | 12344, 12346 | 1 day | FAILED |
| 123461 | B1235 | 1 day | SENT |
| 123430 | 12348 | 1 day | COMPLETED |

TABLE VII

STATUS FIELD OPTIONS IN THE SUBSCRIPTION NOTIFICATION PROGRESS TABLE IN BROKER DATABASE

| Status Options | Definition |
|---|---|
| INIT | Progress details are written to the DB, privacy event not yet sent to the privacy event subscriber |
| SENT | The privacy event has been sent to the privacy event subscriber |
| ACKNOWLEDGED | Privacy event subscriber has acknowledged receipt of the privacy event but not yet honoured the privacy request |
| COMPLETED | Privacy event subscriber has honoured the privacy request and completion notification is received |
| SENDFAILED | Failure in sending the privacy event to the privacy event subscriber. Refers to the last attempt to send or resend the privacy event |
| FAILED | Alert has been sent to the relevant team. Used maximum number of retries |

TABLE VIII

ASYNC NOTIFICATION TYPES AND DEFINITIONS

| Notification Types | Definition |
|---|---|
| Email | Email address of the end user who triggered the privacy event |
| SMS | Mobile Phone number of the end user who triggered the privacy event |
| In-client | Push to the vendor specific mobile notification services for mobile devices and display in the privacy notification section of the front-end tool |

The invention claimed is:

1. A privacy broker system for managing end user privacy controls of a plurality of end users across a plurality of end user services, the privacy broker system being configured to:

receive from a publisher entity a privacy event relating to an end user of the plurality of end users, the privacy event comprising:

a user ID uniquely indicative of the end user; and a privacy request relating to an end user privacy control;

determine, based at least in part on the privacy request, one or more target subscriber entities: and communicate the privacy event to the one or more target subscriber entities, wherein the publisher entity comprises a front-end tool of an end user service, and wherein each of the one or more target subscriber entities comprises a backend service for enacting the privacy request;

a broker database residing in a non-transitory computer readable medium to store the privacy event and an associated progress status identifier that is indicative of progress towards the one or more target subscriber entities enacting the privacy request, wherein the privacy broker system is further to:

receive from a first target subscriber entity of the one or more target subscriber entities a completion notification indicative of the one or more target subscriber entities having successfully enacted the privacy request: and set the progress status identifier associated with the privacy event in the broker database to indicate that the privacy request has been enacted by the first target subscriber entity; and a privacy compliance monitor to:

identify, using the progress status identifier in the broker database, a target subscriber entity of the one or more target subscriber entities for the privacy event that fails to meet an enactment requirement: and upon identifying a target subscriber entity of the one or more target subscriber entities that fails to meet an enactment requirement, re-communicate the privacy event to that target subscriber entity, wherein the enactment requirement comprises a requirement that the one or more target subscriber entities enact the privacy request within a threshold period of time since the privacy event was most recently communicated to the one or more target subscriber entities.

2. The privacy broker system of claim 1, further comprising:

a user notification module configured to:

when the progress status identifier associated with the privacy event in the broker database is set to indicate that the privacy request has been enacted by all of the one or more target subscriber entities, communicate a confirmation of enactment to the end user.

3. The privacy broker system of claim 1, wherein the privacy compliance monitor is further configured to:

if the number of times the privacy event is re-communicated to a particular target subscriber entity of the one of the one or more target subscriber entities exceeds a re-communication threshold, perform a predetermined privacy event failure action.

4. The privacy broker system of claim 3, wherein the predetermined privacy event failure action comprises at least one of:

communicate a failure alert to an entity responsible for the particular target subscriber entity: and set the progress status identifier associated with the privacy event in the broker database to indicate that the particular target subscriber entity has failed to enact the privacy request.

5. The privacy broker system of claim 1, further configured to:

after communicating the privacy event to the one or more target subscriber entities, update the progress status identifier associated with the privacy event in the broker database to indicate that the privacy event has been communicated to the one or more target subscriber entities.

6. The privacy broker system of claim 1, further configured to:

receive from the one or more target subscriber entities an acknowledgment notification indicative of the one or more target subscriber entities receiving the privacy event but not yet enacting the privacy request: and update the progress status identifier associated with the privacy event in the broker database to indicate that the privacy event has been received by the one or more target subscriber entities but has not yet been enacted.

7. The privacy broker system of claim 1 further comprising:

an end user profile database for storing data relating to the end user, wherein the privacy request comprises a request for a desired privacy state of a stateful end user privacy control, and wherein the privacy broker system is further configured to:

store the desired privacy state of the stateful end user privacy control in the end user profile database.

8. The privacy broker system of claim 7, further configured to instruct the one or more target subscribers to obtain the desired privacy state of the stateful end user privacy control from the end user profile database.

9. A method for managing end user privacy controls of a plurality of end users across a plurality of end user services, the method comprising a privacy broker system:

receiving from a publisher entity a privacy event relating to an end user of the plurality of end users, the privacy event comprising:

a user ID uniquely indicative of the end user: and a privacy request relating to an end user privacy control;

determining, based at least in part on the privacy request, one or more target subscriber entities: and communicating the privacy event to the one or more target subscriber entities, wherein the publisher entity comprises a front-end tool of an end user service, and wherein each of the one or more target subscriber entities comprises a backend service for enacting the privacy request;

storing, in a broker database, the privacy event and an associated progress status identifier that is indicative of progress towards the one or more target subscriber entities enacting the privacy request;

receiving from a first target subscriber entity of the one or more target subscriber entities a completion notification indicative of the one or more target subscriber entities having successfully enacted the privacy request: and setting the progress status identifier associated with the privacy event in the broker database to indicate that the privacy request has been enacted by the first target subscriber entity;

identifying, using the progress status identifier in the broker database, a target subscriber entity of the one or more target subscriber entities for the privacy event that fails to meet an enactment requirement: and upon identifying a target subscriber entity of the one or more target subscriber entities that fails to meet an enactment requirement, re-communicating the privacy event to that target subscriber entity, wherein the enactment requirement comprises a requirement that the one or more target subscriber entities enact the privacy request within a threshold period of time since the privacy event was most recently communicated to the one or more target subscriber entities.

10. The method of claim 9, further comprising:

when the progress status identifier associated with the privacy event in the broker database is set to indicate that the privacy request has been enacted by all of the one or more target subscriber entities, communicating a confirmation of enactment to the end user.

11. The method of claim 9, further comprising:

if the number of times the privacy event is re-communicated to a particular target subscriber entity of the one of the one or more target subscriber entities exceeds a re-communication threshold, performing a predetermined privacy event failure action.

12. The method of claim 11, wherein the predetermined privacy event failure action comprises at least one of:

communicating a failure alert to an entity responsible for the particular target subscriber entity: and setting the progress status identifier associated with the privacy event in the broker database to indicate that the particular target subscriber entity has failed to enact the privacy request.

13. The method of claim 9, wherein the privacy request comprises a request for a desired privacy state of a stateful end user privacy control, and wherein the method further comprises:

storing the desired privacy state of the stateful end user privacy control in an end user profile database.

14. The method of claim 9, further comprising:

after communicating the privacy event to the one or more target subscriber entities, update the progress status identifier associated with the privacy event in the broker database to indicate that the privacy event has been communicated to the one or more target subscriber entities.

15. A non-transitory computer readable medium encoded with instructions that, when executed on a processor of an electronic device, perform a method comprising:

receiving from a publisher entity a privacy event relating to an end user of the plurality of end users, the privacy event comprising:

a user D uniquely indicative of the end user: and a privacy request relating to an end user privacy control;

determining, based at least in part on the privacy request, one or more target subscriber entities;

communicating the privacy event to the one or more target subscriber entities, wherein the publisher entity comprises a front-end tool of an end user service, and wherein each of the one or more target subscriber entities comprises a backend service for enacting the privacy request;

storing, in a broker database, the privacy event and an associated progress status identifier that is indicative of progress towards the one or more target subscriber entities enacting the privacy request;

receiving from a first target subscriber entity of the one or more target subscriber entities a completion notification indicative of the one or more target subscriber entities having successfully enacted the privacy request;

setting the progress status identifier associated with the privacy event in the broker database to indicate that the privacy request has been enacted by the first target subscriber entity;

identifying, using the progress status identifier in the broker database, a target subscriber entity of the one or more target subscriber entities for the privacy event that fails to meet an enactment requirement; and upon identifying a target subscriber entity of the one or more target subscriber entities that fails to meet an enactment requirement, re-communicating the privacy event to that target subscriber entity, wherein the enactment requirement comprises a requirement that the one or more target subscriber entities enact the privacy request within a threshold period of time since the privacy event was most recently communicated to the one or more target subscriber entities.

16. The non-transitory computer readable medium of claim 15, wherein the method further comprises:

when the progress status identifier associated with the privacy event in the broker database is set to indicate that the privacy request has been enacted by all of the one or more target subscriber entities, communicating a confirmation of enactment to the end user.

17. The non-transitory computer readable medium of claim 15, wherein the method further comprises:

if the number of times the privacy event is re-communicated to a particular target subscriber entity of the one of the one or more target subscriber entities exceeds a re-communication threshold, performing a predetermined privacy event failure action.

18. The non-transitory computer readable medium of claim 15, wherein the method further comprises:

receiving from the one or more target subscriber entities an acknowledgment notification indicative of the one or more target subscriber entities receiving the privacy event but not yet enacting the privacy request: and updating the progress status identifier associated with the privacy event in the broker database to indicate that the privacy event has been received by the one or more target subscriber entities but has not yet been enacted.

19. The non-transitory computer readable medium of claim 15, wherein the privacy request comprises a request for a desired privacy state of a stateful end user privacy control, and wherein the method further comprises:

storing the desired privacy state of the stateful end user privacy control in the end user profile database.

20. The non-transitory computer readable medium of claim 19, wherein the method further comprises:

instructing the one or more target subscribers to obtain the desired privacy state of the stateful end user privacy control from the end user profile database.

* * * * *

UNITED STATES PATENT AND TRADEMARK OFFICE
CERTIFICATE OF CORRECTION

Page 1 of 1

PATENT NO.        : 10,831,930 B2
APPLICATION NO.   : 15/963200
DATED             : November 10, 2020
INVENTOR(S)       : Narasimha Raghavan Veeraragavan et al.

It is certified that error appears in the above-identified patent and that said Letters Patent is hereby corrected as shown below:

In the Claims

<u>Column 27</u>
Line 49, Claim 15    delete "D" and insert --ID--

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*